H. WINSLOW.
Reel for Fishing-Rods.
No. 166,241.
Patented Aug. 3, 1875.
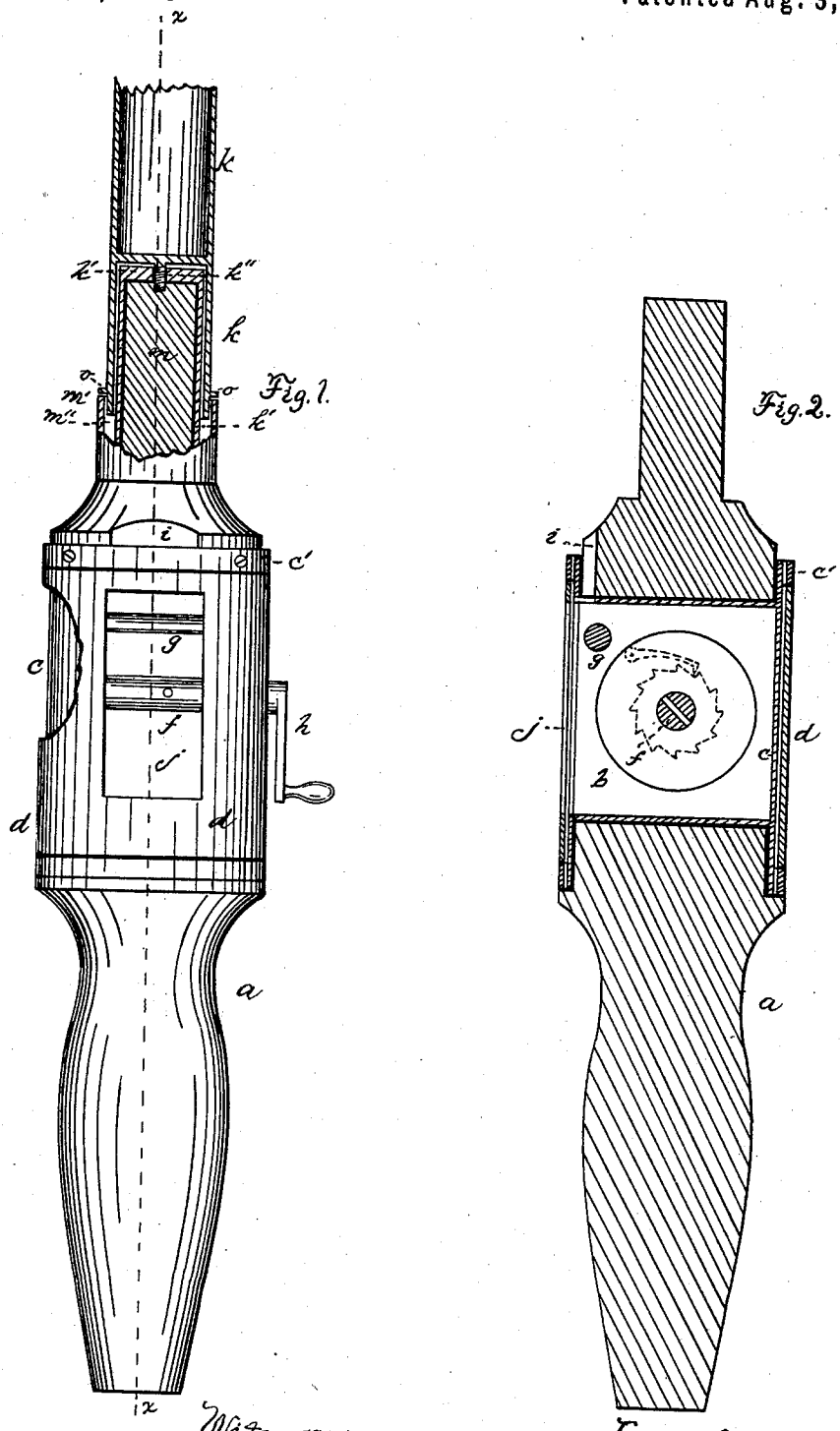
Witnesses:
A. W. Coombs.
Frank H. Jordan.
Inventor:
Hezekiah Winslow

UNITED STATES PATENT OFFICE.

HEZEKIAH WINSLOW, OF PORTLAND, MAINE.

IMPROVEMENT IN REELS FOR FISHING-RODS.

Specification forming part of Letters Patent No. 166,241, dated August 3, 1875; application filed May 12, 1875.

*To all whom it may concern:*

Be it known that I, HEZEKIAH WINSLOW, of Portland, in the county of Cumberland and State of Maine, have invented certain new and useful Improvements in Combined Fishing Rods and Reels; and I do hereby declare that the following is a full, clear, and exact description thereof, which will enable others skilled in the art to which it pertains to make and use the same, reference being had to the accompanying drawings, and to the letters of reference marked thereon, which form a part of this specification.

Figure 1 is a front elevation, in part section, portions being broken out. Fig. 2 is a longitudinal section on line $x\ x$, Fig. 1.

Same letters show like parts.

The object of my invention is to produce an improvement in combined fishing rods and reels.

My invention consists of the arrangement of the reel within the handle of the rod, the said reel being operated by a detachable crank, and having an outer movable cylinder, which surrounds the handle of the rod, and which is provided with an aperture, so that when it is turned upon the handle to a certain position, the reel within the hollow thereof is exposed, in order to introduce the line to be wound upon it.

In the accompanying drawings, $a$ shows the butt or handle of the rod, which is provided with an aperture or mortise, into which fits the reel-box $b$. This reel-box is connected with a slotted cylinder, $c$, which surrounds the handle, as illustrated. Let it be here understood, however, that when in position this cylinder does not cover the mouth or entrance to the reel-box, but, on account of the slot or aperture in the said cylinder, the entrance to the reel-box is left open. Around the inner cylinder $c$ is fitted a similar slotted cylinder, $d$, which is held in position by the metallic ring $c'$, attached to the inner cylinder and handle of the rod by screws or other equivalent means. $f$ shows the reel, which is located within the reel-box, as illustrated; and $g$ represents a guide-roll within this box, over which the line is drawn in being wound upon the reel. $h$ is a detachable handle or crank, provided with a female thread, and is attached to the reel-rod $f$ by being passed through small apertures in the cylinders and screwed upon the end of the said reel.

The operation of my invention may be thus described: The line being attached to the end of the rod, the remainder not in use is brought along the length of the pole, its end passed down through the aperture $i$, over the guide-roll fastened to the reel, and is then wound upon said reel by turning the crank $h$. This crank is then removed and the outer cylinder turned around upon the inner until the entrance to the reel-box is closed, which operation will leave the aperture within the outer cylinder directly over the entrance to the end of the reel. When in this position the line is protected from displacement by any substance, such as twigs and leaves of trees and bushes penetrating or entering the box, and can be as readily wound upon the reel as when in the position first described; for, as has before been remarked, the large aperture in the outer cylinder or casing, which I will designate by $j$, is in such position as to expose the end of the reel-rod, thereby allowing the ready attachment of the handle to it.

A ratchet-and-pawl arrangement (indicated by dotted lines in Fig. 2) is employed to prevent the unwinding of the line upon the reel.

I do not claim, broadly, inserting the reel within the hollow of the handle; neither do I claim a reel inserted within a frame having holders, in such manner that two joints of the rod can be placed in the holder and the reel be in a continuous line with the rod, as shown in patent to P. A. Altmaeir, March 9, 1869, No. 96,652.

What I claim as my invention, and desire to secure by Letters Patent, is—

The combination, in the handle of a fishing-rod, of the reel-box $b$, inner and outer cylinders $c\ d$, having their apertures, as described, and the reel $f$, all combined and arranged to operate substantially as and for the purposes set forth.

In testimony that I claim the foregoing as my own I affix my signature in presence of two witnesses.

HEZEKIAH WINSLOW.

Witnesses:
   A. W. COOMBS,
   WILLIAM G. HART.